US008269472B2

(12) United States Patent
Lin

(10) Patent No.: US 8,269,472 B2
(45) Date of Patent: Sep. 18, 2012

(54) CONTROL CIRCUIT AND METHOD FOR A BUCK-BOOST POWER CONVERTER

(75) Inventor: Shui-Mu Lin, Longjing Township, Taichung County (TW)

(73) Assignee: Richtek Technology Corp., Hsinchu (TW)

( * ) Notice: Subject to any disclaimer, the term of this patent is extended or adjusted under 35 U.S.C. 154(b) by 228 days.

(21) Appl. No.: 12/890,940

(22) Filed: Sep. 27, 2010

(65) Prior Publication Data
US 2011/0074373 A1 Mar. 31, 2011

(30) Foreign Application Priority Data

Sep. 29, 2009 (TW) .............................. 98132933 A

(51) Int. Cl.
*G05F 1/44* (2006.01)
(52) U.S. Cl. ...................................................... 323/282
(58) Field of Classification Search .................. 323/222, 323/224, 283–285, 351
See application file for complete search history.

(56) References Cited

U.S. PATENT DOCUMENTS

| 6,166,527 | A * | 12/2000 | Dwelley et al. ............... 323/222 |
| 7,268,525 | B2* | 9/2007 | Ishii et al. ..................... 323/282 |
| 7,518,346 | B2* | 4/2009 | Prexl et al. .................... 323/222 |
| 8,193,794 | B2* | 6/2012 | Peng et al. .................... 323/282 |
| 2010/0039080 | A1* | 2/2010 | Schoenbauer et al. ........ 323/234 |
| 2010/0231189 | A1* | 9/2010 | Chen et al. .................... 323/284 |
| 2011/0001461 | A1* | 1/2011 | Lu et al. ........................ 323/283 |
| 2011/0050192 | A1* | 3/2011 | Chiu et al. .................... 323/284 |
| 2011/0227550 | A1* | 9/2011 | Walters et al. ................ 323/283 |
| 2012/0105030 | A1* | 5/2012 | Chen et al. .................... 323/271 |
| 2012/0146594 | A1* | 6/2012 | Kobayashi .................... 323/234 |

* cited by examiner

*Primary Examiner* — Adolf Berhane
(74) *Attorney, Agent, or Firm* — Rosenberg, Klein & Lee

(57) ABSTRACT

Control signals are generated for a buck-boost power stage of a buck-boost power converter to convert an input voltage to an output voltage. The buck-boost power stage includes an inductor and at least two power switches connected thereto. The output voltage is monitored to generate an error signal having clamped level according to a first detecting signal related to at least one of the input voltage, output voltage and inductor current. In a buck-boost mode, a compensation signal and a duty insertion signal are generated according to a second detecting signal related to at least one of the input voltage, output voltage, inductor current and variation of the output voltage, the error signal is compensated with the compensation signal to generate a compensated error signal, and the control signals are determined upon the combination of the compensated error signal, the duty insertion signal and a ramp signal.

76 Claims, 9 Drawing Sheets

CONTROL CIRCUIT AND METHOD FOR A BUCK-BOOST POWER CONVERTER

FIELD OF THE INVENTION

The present invention is related generally to a buck-boost power converter and, more particularly, to a control circuit and method for a buck-boost power converter.

BACKGROUND OF THE INVENTION

As shown in FIG. 1, a conventional synchronous buck-boost power converter 10 includes a buck-boost power stage 12, and a control circuit 14 to provide control signals VA, VB, VC and VD t6 switch the power switches SWA, SWB, SWC and SWD in the buck-boost power stage 12, respectively, to convert an input voltage Vin to an output voltage Vo. In the control circuit 14, resistors R1 and R2 establish a voltage divider to divide the output voltage Vo to generate a feedback signal VFB, an error amplifier 24 amplifies the difference between the feedback signal VFB and a reference voltage Vref to generate an error signal VCL, a signal generator 22 provides a signal VU related to the error signal VCL and ramp signals VX and VY, a comparator 18 compares the signal VU with the ramp signal VX to generate a signal VZ1, a comparator 20 compares the signal VU with the ramp signal VY to generate a signal VZ2, and a drive logic circuitry 16 generates the control signals VA, VB, VC and VD according to the signals VZ1 and VZ2.

FIG. 2 is a waveform diagram of the buck-boost power converter 10 shown in FIG. 1, in which waveform 26 represents the ramp signal VY, waveform 28 represents the signal VU, waveform 30 represents the ramp signal VX, waveform 32 represents the signal VZ1, waveform 34 represents the signal VZ2, waveform 36 represents the control signal VA, waveform 38 represents the control signal VB, waveform 40 represents the control signal VC, and waveform 42 represents the control signal VD. Referring to FIGS. 1 and 2, as shown by the waveforms 28, 30 and 32, when the ramp signal VX is higher than the signal VU, e.g., from time t1 to time t2, the signal VZ1 is low, and when the ramp signal VX is lower than the signal VU, e.g., from time t2 to time t5, the signal VZ1 is high. As shown by the waveforms 26, 28 and 34, when the ramp signal VY is higher than the signal VU, e.g., from time t0 to time t3, the signal VZ2 is low, and when the ramp signal VY is lower than the signal VU, e.g., from time t3 to time t4, the signal VZ2 is high. The duration of time t1 to time t5 is a cycle of the output voltage Vo. From time t1 to time t2, the buck-boost power stage 12 is in a first state, during which the power switches SWA and SWC are off and the power switches SWB and SWD are on, as shown by the waveforms 36 to 42. From time t2 to time t3, the buck-boost power stage 12 is in a second state, during which the power switches SWA and SWD are on and the power switches SWB and SWC are off. From time t3 to time t4, the buck-boost power stage 12 is in a third state, during which the power switches SWA and SWC are on and the power switches SWB and SWD are off. From time t4 to time t5, the buck-boost power stage 12 is also in the second state. Thus the second state appears twice in a cycle. If the switching sequence of the power switches SWA, SWB, SWC and SWD can be changed such that the two time periods of the second state in a cycle are arranged next to each other, then the switching loss can be minimized and thereby the efficiency is improved. Furthermore, when the signal VU increases to be close to a peak of the ramp signal VX or decreases to be close to a valley of the ramp signal VY, the control signal VB or VC will have a very short duty and thereby the power switch SWB or SWC will be turned off before being turned on completely, which is meaningless apart from increasing the switching loss.

U.S. Pat. No. 7,176,667 teaches to switch the power switches SWA, SWB, SWC and SWD in a buck-boost mode according to a pulse-width modulation (PWM) signal having a modulated pulse width varying with the output voltage Vo and a signal having a fixed pulse width to insert a fixed duty in each cycle. However, this fixed duty inserted method may cause a discontinuous duty during mode switching and thereby result in large output ripple.

Therefore, it is desired a control circuit and method for optimized switching sequence of the power switches, improved efficiency, and minimized output ripple whenever mode transient.

SUMMARY OF THE INVENTION

An object of the present invention is to provide a control circuit and method for a buck-boost power converter.

Another object of the present invention is to provide a control circuit and method for optimizing the switching sequence of the power switches in a buck-boost power converter to improve the efficiency thereof.

A further object of the present invention is to provide a control circuit and method for minimizing output ripple of a buck-boost power converter whenever mode transient.

A still further object of the present invention is to provide a control circuit and method for minimizing the transient response of a buck-boost power converter from a power saving mode to normal operation.

According to the present invention, a buck-boost power stage of a buck-boost power converter has an inductor and at least two power switches connected to the inductor, and a control circuit for providing control signals to drive the buck-boost power stage to convert an input voltage to an output voltage includes a feedback circuit to detect the output voltage to generate a feedback signal, an error amplifier to amplify the difference between the feedback signal and a reference voltage to generate an error signal, a dynamic duty generator to generate a duty insertion signal according to a detecting signal after being enabled, and a driver to determine the control signals according to the error signal and duty insertion signal. The detecting signal is related to at least one of the input voltage, output voltage, inductor current flowing through the inductor, and variation of the output voltage.

According to the present invention, a buck-boost power stage of a buck-boost power converter has an inductor and at least two power switches connected to the inductor, and a control method for providing control signals to drive the buck-boost power stage to convert an input voltage to an output voltage includes detecting the output voltage to generate a feedback signal, amplifying the difference between the feedback signal and a reference voltage to generate an error signal, determining a duty insertion signal according to a detecting signal, asserting the duty insertion signal responsive to an enable signal, and determining the control signals according to the error signal and duty insertion signal. The detecting signal is related to at least one of the input voltage, output voltage, inductor current flowing through the inductor, and variation of the output voltage.

According to the present invention, a buck-boost power stage of a buck-boost power converter has an inductor and at least two power switches connected to the inductor, and a control circuit for providing control signals to drive the buck-boost power stage to convert an input voltage to an output voltage includes a feedback circuit to detect the output voltage to generate a feedback signal, an error amplifier to amplify the difference between the feedback signal and a reference voltage to generate an error signal, a duty compensator to compensate the error signal according to a compensation signal to generate a compensated error signal, a dynamic duty generator to generate a duty insertion signal after being enabled, and a driver to determine the control signals according to the compensated error signal and duty insertion signal.

According to the present invention, a buck-boost power stage of a buck-boost power converter has an inductor and at least two power switches connected to the inductor, and a control method for providing control signals to drive the buck-boost power stage to convert an input voltage to an output voltage includes detecting the output voltage to generate a feedback signal, amplifying the difference between the feedback signal and a reference voltage to generate an error signal, compensating the error signal to generate a compensated error signal, asserting a duty insertion signal responsive to an enable signal, and determining the control signals according to the compensated error signal and duty insertion signal.

According to the present invention, a buck-boost power stage of a buck-boost power converter has an inductor and at least two power switches connected to the inductor, and a control circuit for providing control signals to drive the buck-boost power stage to convert an input voltage to an output voltage includes a feedback circuit to detect the output voltage to generate a feedback signal, an error amplifier to amplify the difference between the feedback signal and a reference voltage to generate an error signal, a clamping circuit to clamp the level of the error signal according to a detecting signal, and a driver to determine the control signals according to the error signal and a duty insertion signal. The detecting signal is related to at least one of the input voltage, output voltage, and inductor current flowing through the inductor.

According to the present invention, a buck-boost power stage of a buck-boost power converter has an inductor and at least two power switches connected to the inductor, and a control method for providing control signals to drive the buck-boost power stage to convert an input voltage to an output voltage includes detecting the output voltage to generate a feedback signal, amplifying the difference between the feedback signal and a reference voltage to generate an error signal, clamping the level of the error signal according to a detecting signal, and determining the control signals according to the error signal and a duty insertion signal. The detecting signal is related to at least one of the input voltage, output voltage, and inductor current flowing through the inductor.

According to the present invention, a buck-boost power stage of a buck-boost power converter has an inductor and at least two power switches connected to the inductor, and a control circuit for providing control signals to drive the buck-boost power stage to convert an input voltage to an output voltage includes a feedback circuit to detect the output voltage to generate a feedback signal, an error amplifier to amplify the difference between the feedback signal and a reference voltage to generate an error signal, a clamping circuit to clamp the level of the error signal according to a first detecting signal, a duty compensator to compensate the error signal according to a compensation signal to generate a compensated error signal, a dynamic duty generator to generate a duty insertion signal according to a second detecting signal after being enabled, a mode selector to provide an enable signal to enable the dynamic duty generator, and a driver to determine the control signals according to the compensated error signal and duty insertion signal. The first detecting signal is related to at least one of the input voltage, output voltage, and inductor current flowing through the inductor, and the second detecting signal is related to at least one of the input voltage, output voltage, inductor current, and variation of the output voltage.

According to the present invention, a buck-boost power stage of a buck-boost power converter has an inductor and at least two power switches connected to the inductor, and a control method for providing control signals to drive the buck-boost power stage to convert an input voltage to an output voltage includes detecting the output voltage to generate a feedback signal, amplifying the difference between the feedback signal and a reference voltage to generate an error signal, clamping the level of the error signal according to a first detecting signal, asserting a duty insertion signal responsive to an enable signal, determining the duty insertion signal according to a second detecting signal, compensating the error signal to generate a compensated error signal, and determining the control signals according to the compensated error signal and duty insertion signal. The first detecting signal is related to at least one of the input voltage, output voltage, and inductor current flowing through the inductor, and the second detecting signal is related to at least one of the input voltage, output voltage, inductor current, and variation of the output voltage.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
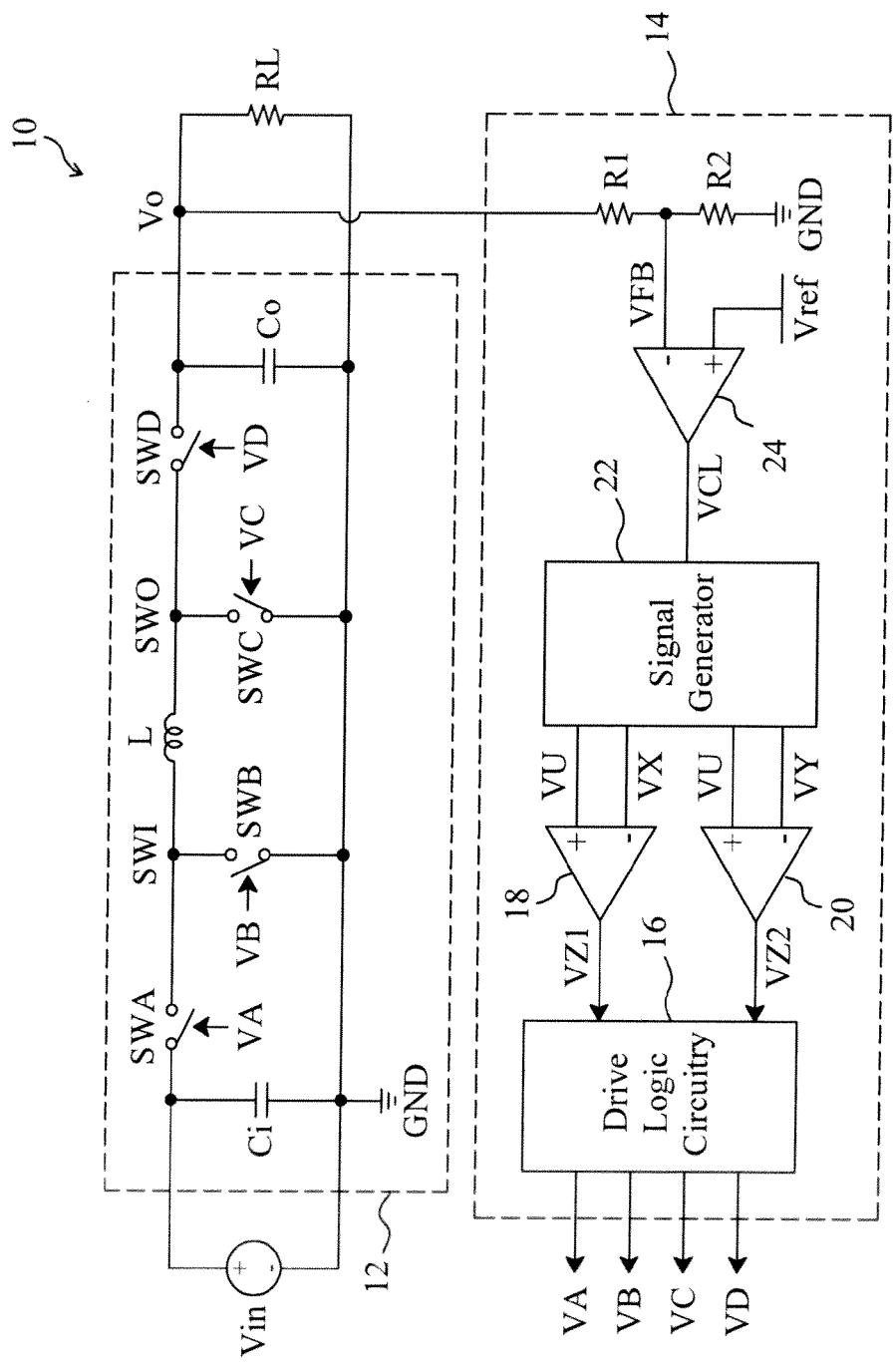
FIG. 1 is a circuit diagram of a conventional synchronous buck-boost power converter.
Figure 2:
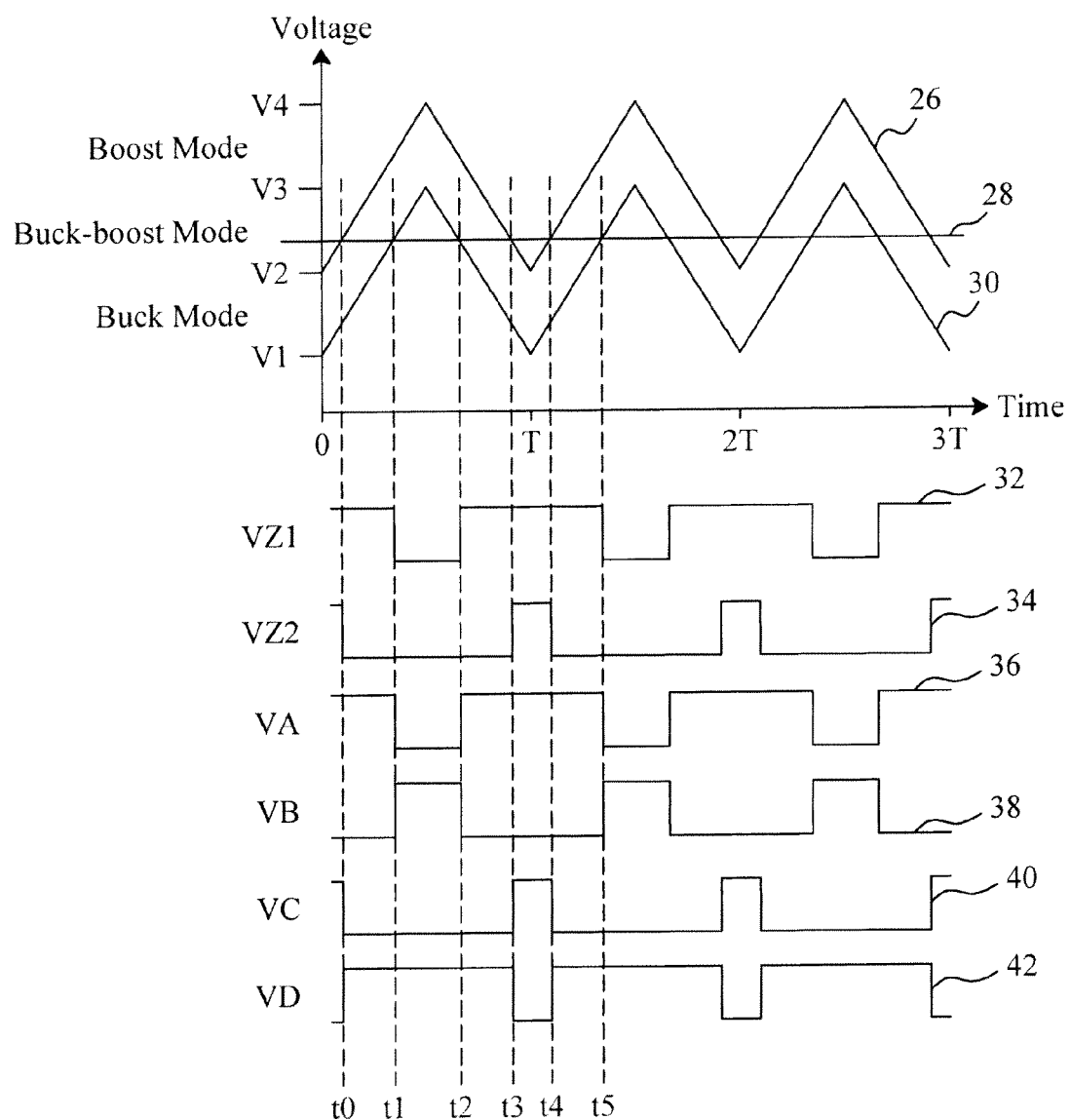
FIG. 2 is a waveform diagram of the buck-boost power converter shown in FIG. 1.
Figure 3:
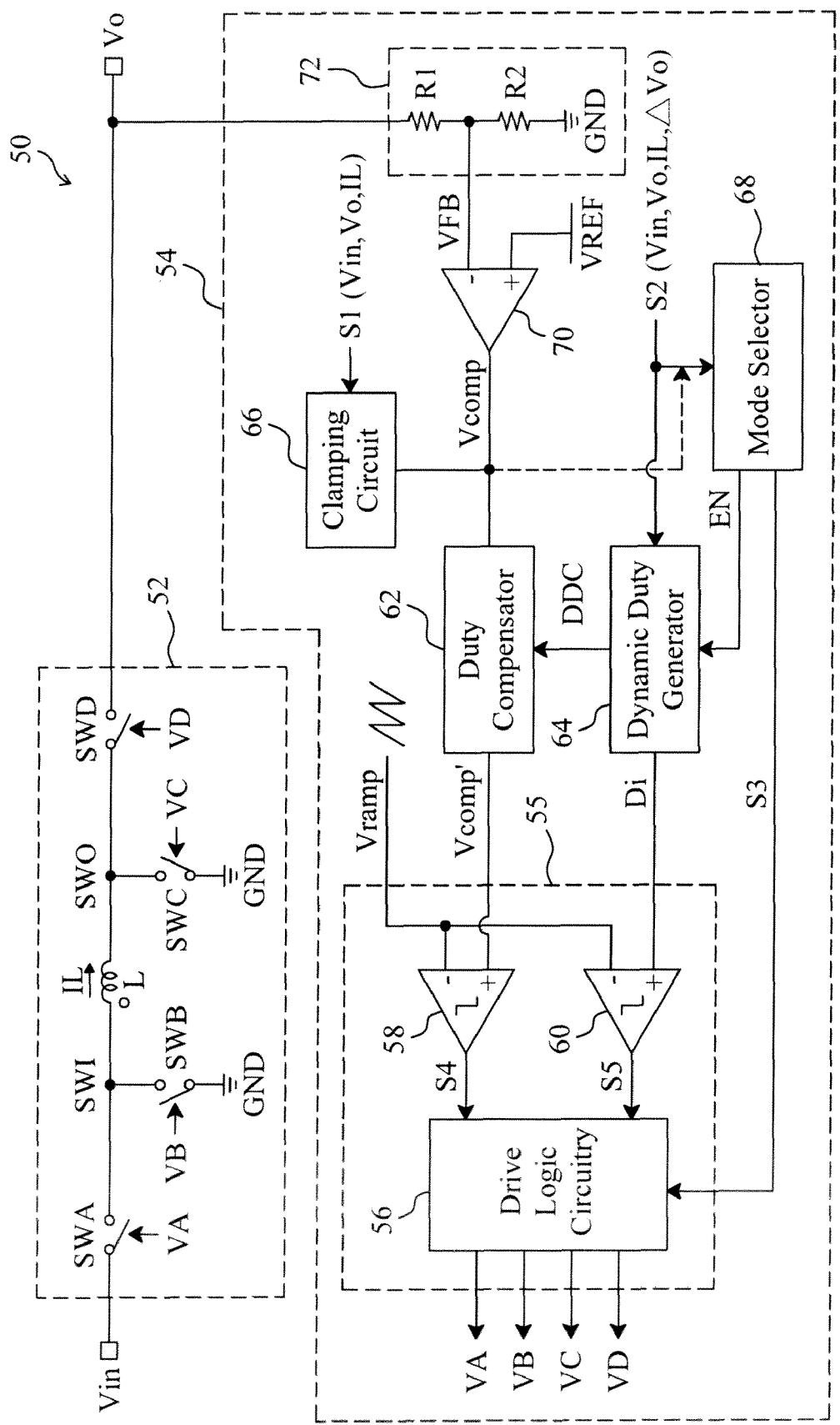
FIG. 3 is a circuit diagram of a buck-boost power converter according to the present invention.

In an embodiment according to the present invention, as shown in FIG. 3, a buck-boost power converter 50 includes a buck-boost power stage 52 and a control circuit 54 to provide control signals VA, VB, VC and VD to switch the power switches SWA, SWB, SWC and SWD connected to an inductor L in the buck-boost power stage 52 to convert an input voltage Vin to an output voltage Vo. In the control circuit 54, a feedback circuit 72 detects the output voltage Vo to generate a feedback signal VFB, an error amplifier 70 amplifies the difference between the feedback signal VFB and a reference voltage VREF to generate an error signal Vcomp, a clamping circuit 66 clamps the level of the error signal Vcomp according to a detecting signal S1 related to at least one of the input voltage Vin, output voltage Vo and inductor current IL, a mode selector 68 generates a mode switch signal S3 according to a detecting signal S2 related to at least one of the input voltage Vin, output voltage Vo, inductor current IL and variation ΔVo of the output voltage Vo for a drive logic circuitry 56 and an enable signal EN to enable a dynamic duty generator 64, the dynamic duty generator 64 determines a dynamic duty insertion signal Di and a compensation signal DDC according to the detecting signal S2, a duty compensator 62 compensates the error signal Vcomp to generate a compensated error signal Vcomp' according to the compensation signal DDC, and a driver 55 generates the control signals VA, VB, VC and VD according to a ramp signal Vramp, the compensated error signal Vcomp', the duty insertion signal Di and the mode switch signal S3. Alternatively, in other embodiments, the mode selector 68 may generate the signals S3 and EN according to the error signal Vcomp, instead of the detecting signal S2. The driver 55 includes a comparator 58 to compare the compensated error signal Vcomp' with the ramp signal Vramp to generate a comparison signal S4, a comparator 60 to compare the ramp signal Vramp with the duty insertion signal Di to generate a comparison signal S5, and the drive logic circuitry 56 to determine the control signals VA, VB, VC and VD according to the signals S3, S4 and S5.

Figure 4:
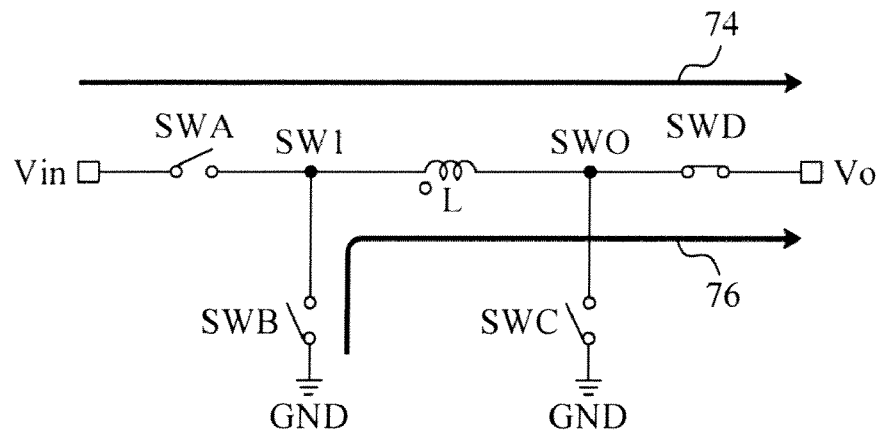
FIG. 4 shows the current paths of the buck-boost power stage shown in FIG. 3 in a buck mode.
Figure 5:
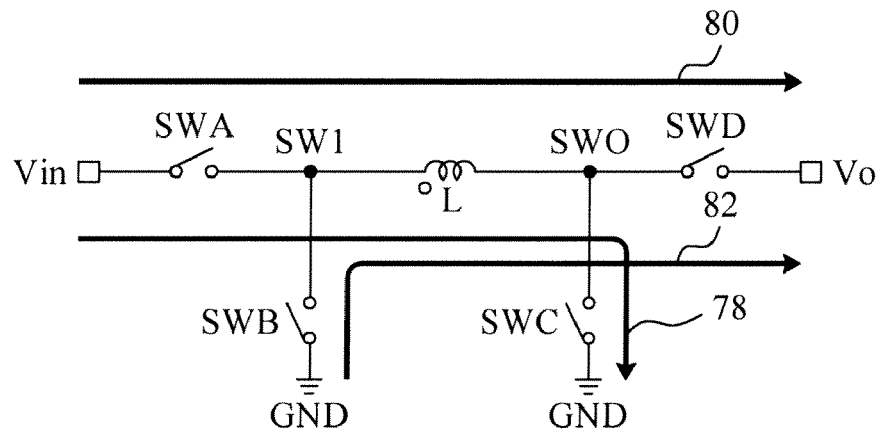
FIG. 5 shows the current paths of the buck-boost power stage shown in FIG. 3 in a buck-boost mode.
Figure 6:
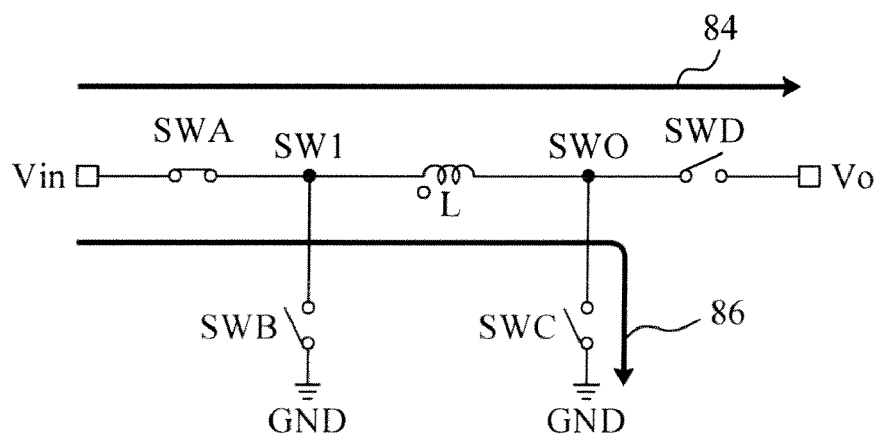
FIG. 6 shows the current paths of the buck-boost power stage shown in FIG. 3 in a boost mode.

FIG. 4 shows the current paths of the buck-boost power stage 52 in a buck mode, in which mode the power switch SWC keeps off and the power switch SWD keeps on. A buck charge path 74 is established if the power switch SWA is on and the power switch SWB is off, and a buck discharge path 76 is established if the power switch SWA is off and the power switch SWB is on. FIG. 5 shows the current paths of the buck-boost power stage 52 in a buck-boost mode, in which mode a boost charge path 78 is established if the power switches SWA and SWC are on and the power switches SWB and SWD are off, a buck charge path or boost discharge path 80 is established if the power switches SWA and SWD are on and the power switches SWB and SWC are off, and a buck discharge path 82 is established if the power switches SWB and SWD are on and the power switches SWA and SWC are off. FIG. 6 shows the current paths of the buck-boost power stage 52 in a boost mode, in which mode the power switch SWA keeps on and the power switch SWB keeps off. A boost charge path 86 is established if the power switch SWC is on and the power switch SWD is off, and a boost discharge path 84 is established if the power switch SWC is off and the power switch SWD is on.

Figure 7:
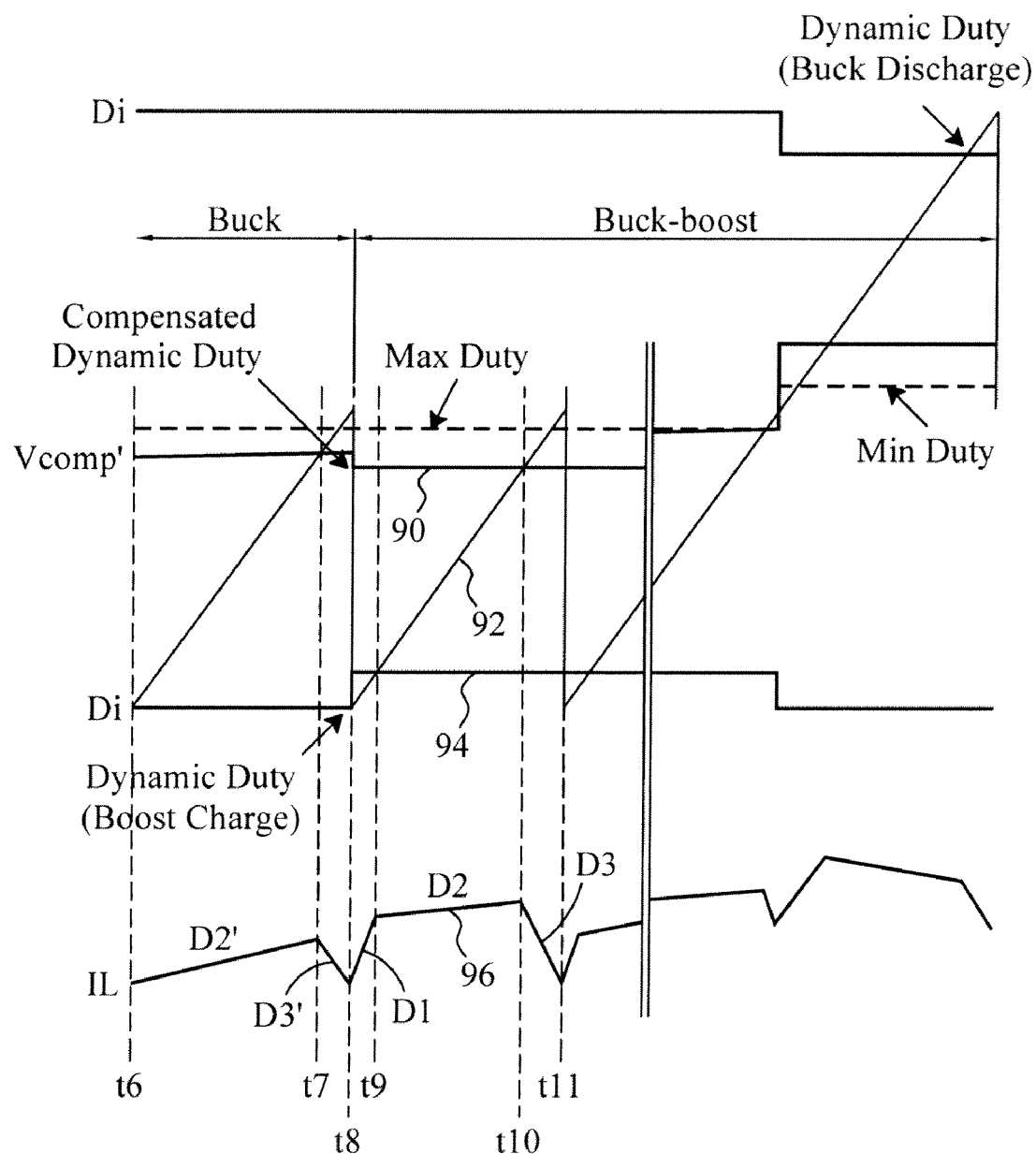
FIG. 7 is a waveform diagram of the buck-boost power converter shown in FIG. 3 from a buck mode to a buck-boost mode.

FIG. 7 is a waveform diagram of the buck-boost power converter 50 from a buck mode to a buck-boost mode, in which waveform 90 represents the compensated error signal Vcomp', waveform 92 represents the ramp signal Vramp, waveform 94 represents the duty insertion signal Di, and waveform 96 represents the inductor current IL. Referring to FIGS. 3 and 7, in the buck mode, the dynamic duty generator 64 is turned off, so the duty insertion signal Di is zero. As a result, the power switch SWC keeps off and the power switch SWD keeps on. In this case, the compensated error signal Vcomp' and the ramp signal Vramp control the power switches SWA and SWB to control the inductor current IL to increase or decrease, as shown by the waveforms 90, 92 and 96. During a buck charge period D2', e.g., from time t6 to time t7, the power switch SWA is on and the power switch SWB is off, so the inductor current IL increases. During a buck discharge period D3', e.g., from time t7 to time t8, the power switch SWA is off and the power switch SWB is on, so the inductor current IL decreases. When entering the buck-boost mode from the buck mode, e.g., at time t8, the mode selector 68 asserts the enable signal EN to enable the dynamic duty generator 64, so the duty insertion signal Di becomes non-zero, as shown by the waveform 94, and thus a boost charge period D1 results, e.g., from time t8 to time t9. Because the duty insertion signal Di varies with the detecting signal S2, the boost charge period D1 also varies with the detecting signal S2. To avoid large output ripple resulted from the inserted boost charge period D1, the dynamic duty generator 64 may send out the compensation signal DDC to the duty compensator 62 so that the compensated error signal Vcomp' decreases as the duty insertion signal Di increases, as shown by the waveforms 90 and 94. Thereby, the buck charge period decreases from D2' to D2, and the buck discharge period increases from D3' to D3. Thus, as shown at time t8 and time t11, the initial level and the ending level of the inductor current IL are the same in each cycle, so large output ripple can be avoided. As can be seen from the waveform 96 of FIG. 7, the duration from time t8 to time t11 is a cycle, in which a boost charging state is from time t8 to time t9, a buck charging state is from time t9 to time t10, and a buck discharging state is from time t10 to time t11. No duplicated state appears in each cycle; in other words, the switching sequence of the power switches SWA, SWB, SWC and SWD is optimized by the control circuit 54 of the present invention, so the switching loss is minimized. In this embodiment, although only the operation of switching from a buck mode to a buck-boost mode is described, the operation of switching from a boost mode to a buck-boost mode will be readily known by those skilled in the art and, thus, will not be further described herein.

Figure 8:
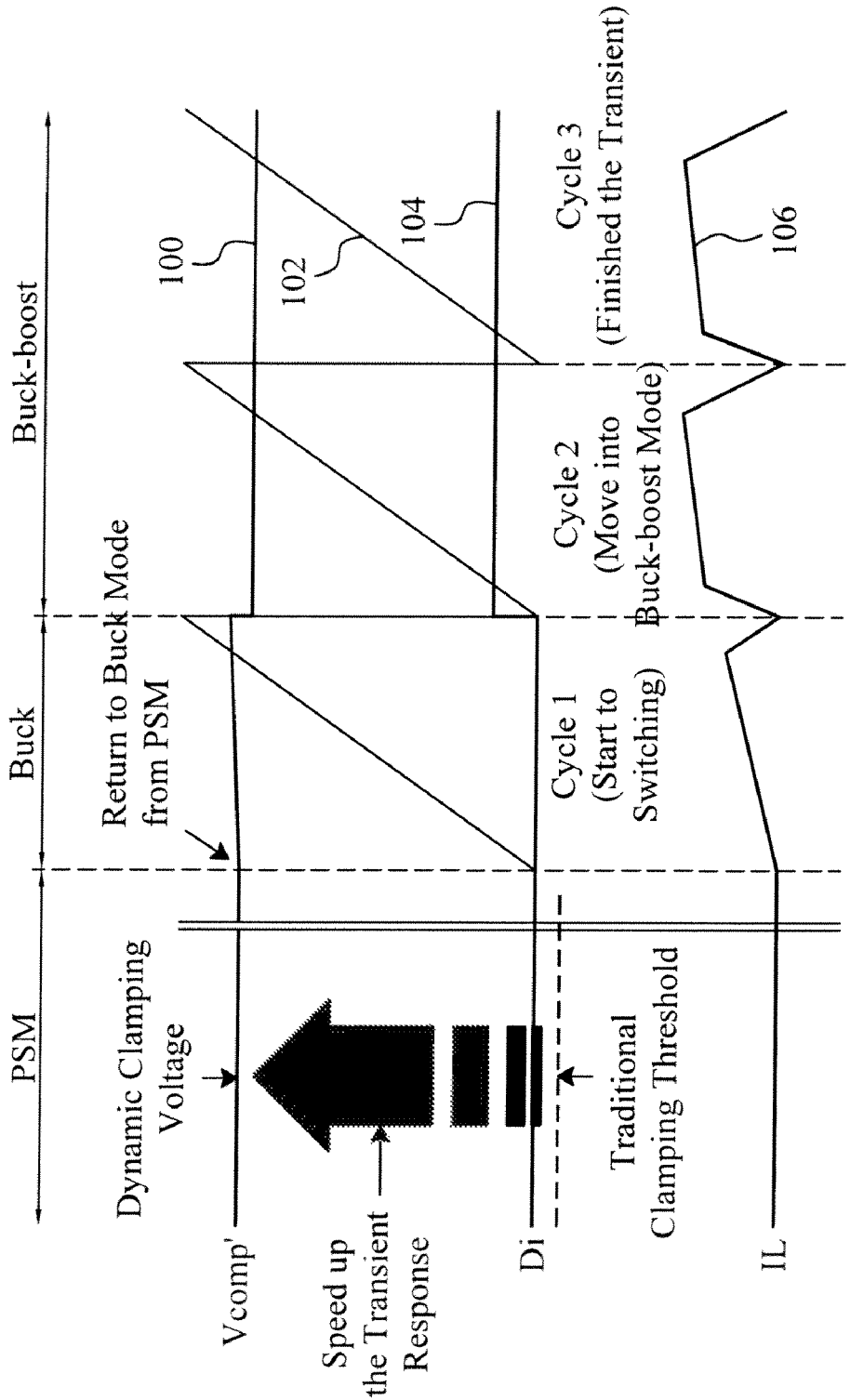
FIG. 8 is a waveform diagram of the buck-boost power converter shown in FIG. 3 from a power saving mode to normal operation.

FIG. 8 is a waveform diagram of the buck-boost power converter 50 from a power saving mode to normal operation, in which waveform 100 represents the compensated error signal Vcomp', waveform 102 represents the ramp signal Vramp, waveform 104 represents the duty insertion signal Di, and waveform 106 represents the inductor current IL. To save energy, power converters currently available are all set to have a power saving mode, for example a pulse skipping mode (PSM). When a conventional buck-boost power converter needs to switch back to a buck-boost mode from a power saving mode, it must first enter a buck mode and then, after the error signal Vcomp increases to a threshold value from zero, enters a buck-boost mode. However, it may take several cycles for the error signal Vcomp to increase to the threshold value from zero. Referring to FIG. 8, when the buck-boost power converter 50 of the present invention switches back to a buck-boost mode from a power saving mode, it switches back to a buck mode from the power saving mode in a first cycle. Because the clamping circuit 66 can dynamically clamp the level of the error signal Vcomp according to the detecting signal S1, it is unnecessary for the error signal Vcomp to increase slowly from zero. Moreover, the dynamic duty generator 64 is turned off in the buck mode, so Vcomp'=Vcomp. In other words, the compensated error signal Vcomp' is clamped at a level close to the threshold value, as shown by the waveform 100. Thereby, the buck-boost power converter 50 enters the buck-boost mode from the buck mode immediately in a second cycle, and terminates the transient response in a third cycle. In other words, the clamping circuit 66 in the control circuit 54 can speed up the transient response that is switching from the power saving mode back to the buck-boost mode.

Figure 9:
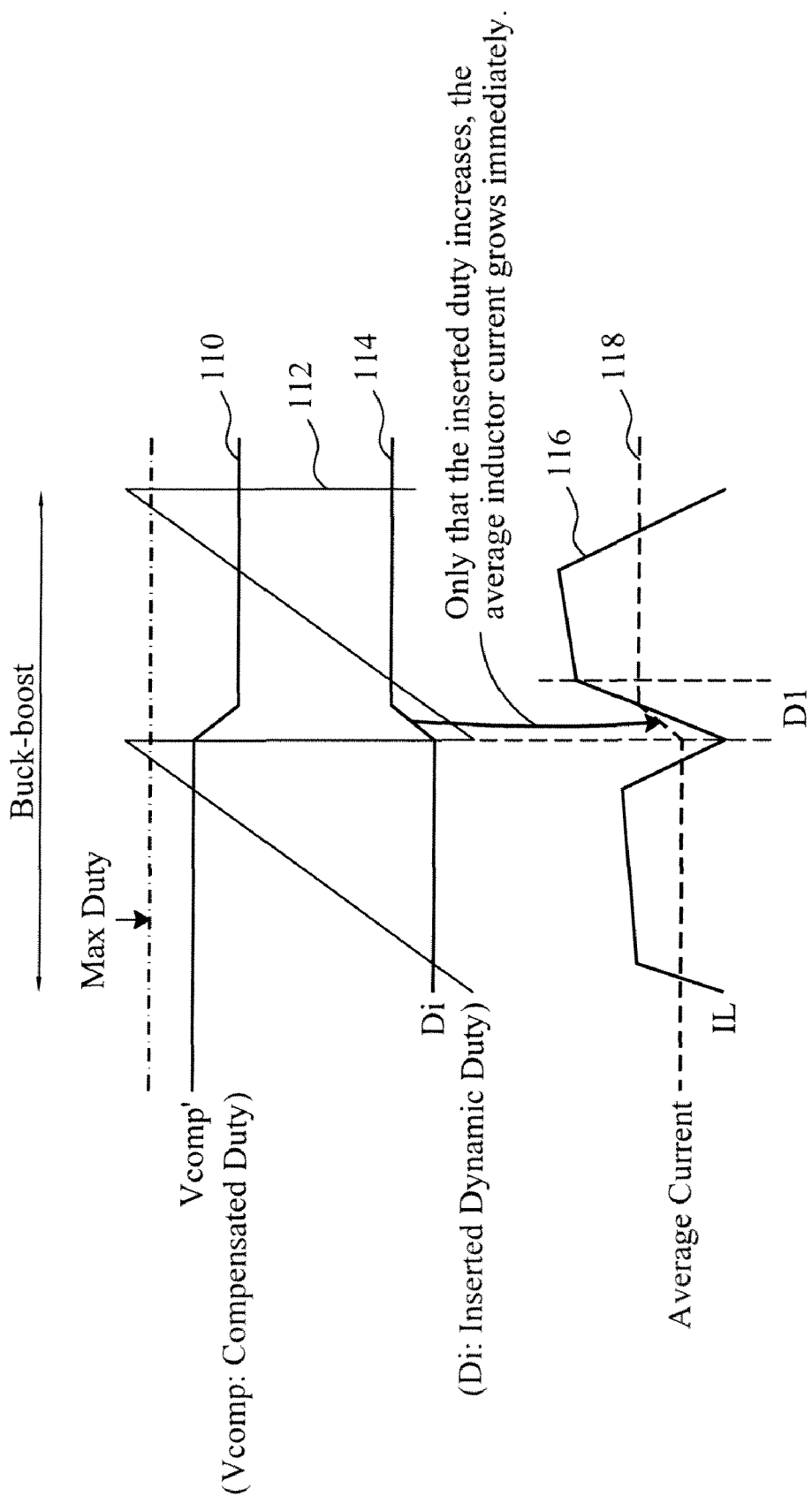
FIG. 9 is a waveform diagram of the buck-boost power converter shown in FIG. 3 in a buck-boost mode.

FIG. 9 is a waveform diagram of the buck-boost power converter 50 in a buck-boost mode, in which waveform 110 represents the compensated error signal Vcomp', waveform 112 represents the ramp signal Vramp, waveform 114 represents the duty insertion signal Di, waveform 116 represents the inductor current IL, and waveform 118 represents the average value of the inductor current IL. In the buck-boost mode, when the duty insertion signal Di increases, as shown by the waveform 114, the boost charge period D1 increases. Thereby, the average value of the inductor current IL increases correspondingly, as shown by the waveform 118, and meanwhile, the dynamic duty generator 64 outputs the compensation signal DDC to the duty compensator 62 to decrease the compensated error signal Vcomp', as shown by the waveform 110. When the duty insertion signal Di changes, the average value of the inductor current IL also changes correspondingly, so it is unnecessary for the control circuit 54 to adjust the inductor current IL according to the error signal Vcomp.

Figure 10:
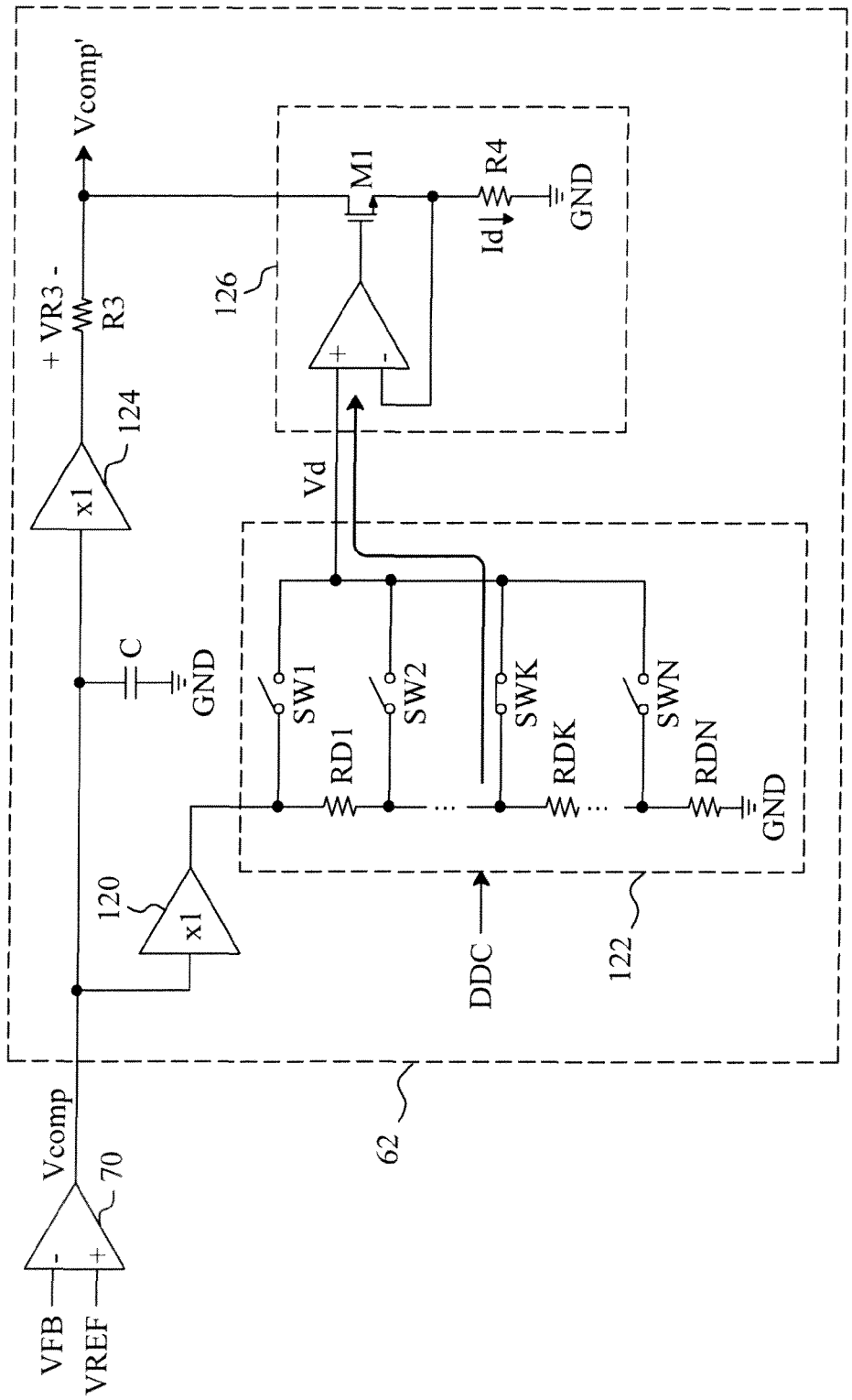
FIG. 10 is a circuit diagram of an embodiment for the duty compensator shown in FIG. 3.

FIG. 10 is a circuit diagram of an embodiment for the duty compensator 62 shown in FIG. 3. The error signal Vcomp from the error amplifier 70 is transmitted to a voltage dividing circuit 122 and a resistor R3 through buffers 120 and 124, respectively. The voltage dividing circuit 122 consisting of a plurality of resistors RD1-RDN and a plurality of switches SW1-SWN divides the error signal Vcomp to generate a divided error voltage Vd, and the switches SW1-SWN are controlled by the compensation signal DDC from the dynamic duty generator 64. A voltage-to-current converter 126 converts the divided error voltage Vd into a compensating current Id, which flows through the resistor R3 to generate a compensating voltage VR3, and the compensated error signal Vcomp' is obtained by subtracting the compensating voltage VR3 from the error signal Vcomp.

Figure 11:
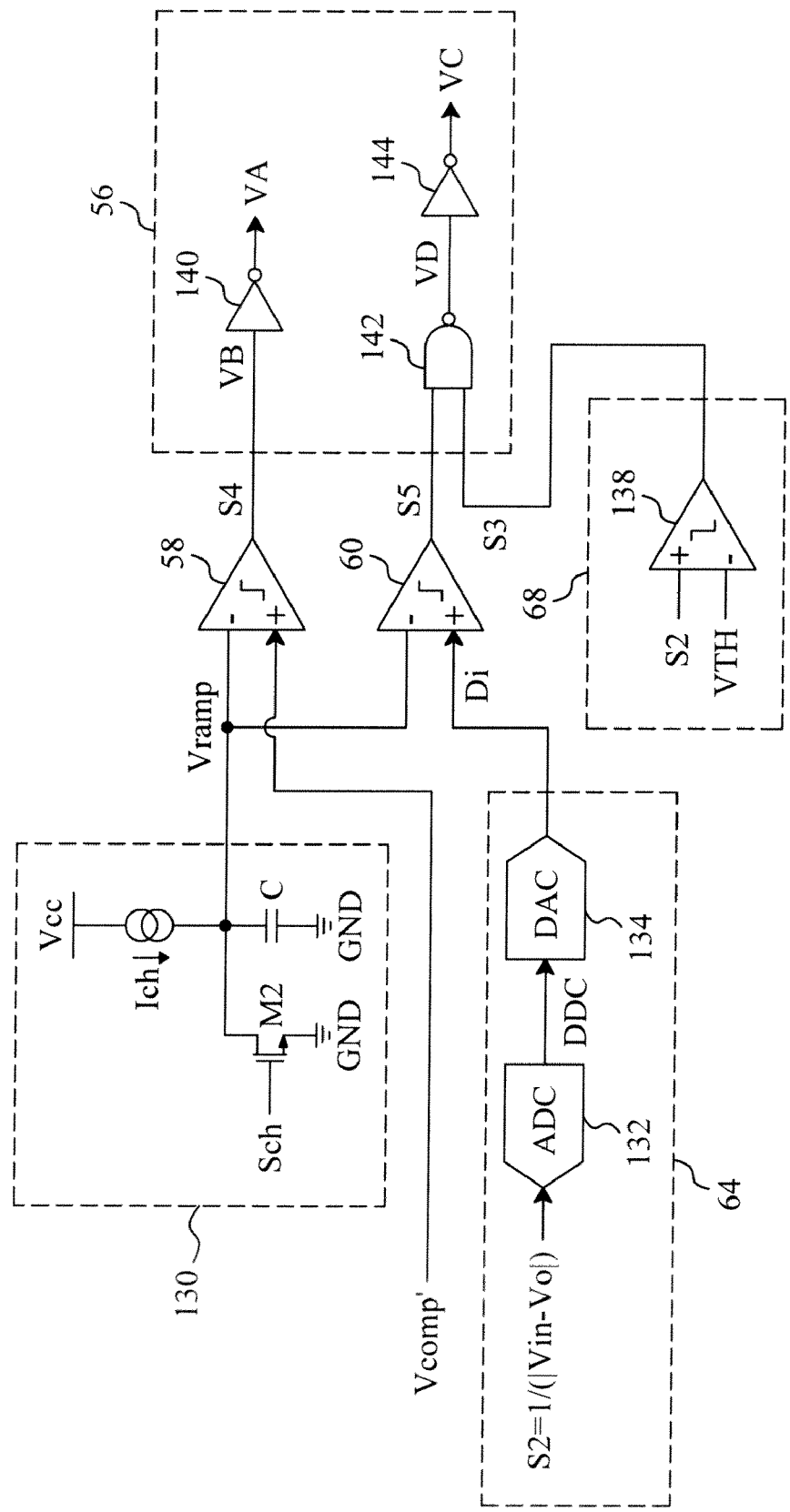
FIG. 11 is a circuit diagram of an embodiment for the drive logic circuitry, dynamic duty generator and mode selector shown in FIG. 3.

FIG. 11 is a circuit diagram of an embodiment for the drive logic circuitry 56, dynamic duty generator 64 and mode selector 68 shown in FIG. 3. In FIG. 11, a ramp generator 130 consisting of a switch M2, a current source Ich and a capacitor C provides the ramp signal Vramp. The drive logic circuitry 56 includes inverters 140 and 144 and a NAND gate 142, in which the signal S4 from the comparator 58 functions as the control signal VB, the inverter 140 inverts the control signal VB to generate the control signal VA, the NAND gate 142 generates the control signal VD according to the signals S3 and S5, and the inverter 144 inverts the control signal VD to generate the control signal VC. In the dynamic duty generator 64, an analog-to-digital converter 132 converts the detecting signal S2 into the compensation signal DDC, which is a digital signal, and then a digital-to-analog converter 134 converts the compensation signal DDC into the duty insertion signal Di, which is an analog signal. The mode selector 68 includes a comparator 138 to compare the detecting signal S2 with a threshold value VTH to generate the mode switch signal S3. The threshold value VTH is used to determine whether to switch the power converter 50 to the buck-boost mode, which may be a fixed value, or be dependent on the inductor current IL or the variation of the output voltage Vo. A dynamic threshold value VTH can help to improve the efficiency of the power converter 50 and the ripple of the output voltage Vo, and additionally, accelerate the transient response of a load or a power source. In the case that the threshold value VTH varies with the inductor current IL, when the load is heavier and the inductor current is larger, the threshold value VTH is increased to have the buck-boost power converter 50 work in the buck-boost mode, in which mode the charge or discharge process is accelerated to prevent occurrence of undue ripple. In the case that the threshold value VTH varies with the variation of the output voltage Vo, when the variation of the output voltage Vo increases, the threshold value VTH increases to enlarge the operating area to enter the buck-boost mode, in which mode the inductor current IL is easy to be charged or discharged, thereby reducing the ripples of the output voltage Vo.

In other embodiments, a fixed duty generator that provides a fixed signal may be used to replace the dynamic duty generator 64.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit for providing control signals to drive a buck-boost power stage of a buck-boost power converter to convert an input voltage to an output voltage, the buck-boost power stage including an inductor and at least two power switches connected to the inductor, the control circuit comprising:
a feedback circuit operative to detect the output voltage to generate a feedback signal;
an error amplifier connected to the feedback circuit, for amplifying a difference between the feedback signal and a reference voltage to generate an error signal;
a dynamic duty generator operative to generate a duty insertion signal according to a detecting signal after being enabled; and
a driver connected to the dynamic duty generator, operative to determine the control signals according to the error signal and the duty insertion signal.

2. The control circuit of claim 1, wherein the detecting signal is related to at least one of the input voltage, the output voltage, an inductor current flowing through the inductor, and a variation of the output voltage.

3. The control circuit of claim 1, wherein the dynamic duty generator provides a compensation signal according to the detecting signal for compensating the error signal.

4. The control circuit of claim 3, wherein the dynamic duty generator comprises:
an analog-to-digital converter for converting the detecting signal into the compensation signal; and
a digital-to-analog converter connected to the analog-to-digital converter, for converting the compensation signal into the duty insertion signal.

5. The control circuit of claim 3, further comprising a duty compensator connected to the error amplifier, dynamic duty generator and driver, operative to compensate the error signal according to the compensation signal.

6. The control circuit of claim 5, wherein the duty compensator comprises:
a voltage dividing circuit connected to the error amplifier, for dividing the error signal responsive to the compensation signal to generate a divided error voltage;
a voltage-to-current converter connected to the voltage dividing circuit, for converting the divided error voltage into a compensating current; and
a resistor connected between the error amplifier and the voltage-to-current converter, for generating a compensating voltage for adjusting the error signal in response to the compensating current.

7. The control circuit of claim 1, wherein the driver comprises:
a first comparator for comparing the error signal with a ramp signal to generate a first comparison signal;
a second comparator connected to the dynamic duty generator, for comparing the duty insertion signal with the ramp signal to generate a second comparison signal; and
a drive logic circuitry connected to the first and second comparators, operative to generate the control signals according to the first and second comparison signals.

8. The control circuit of claim 1, further comprising a mode selector connected to the dynamic duty generator, operative to generate an enable signal for enabling the dynamic duty generator according to the detecting signal.

9. The control circuit of claim 1, further comprising a mode selector connected to the dynamic duty generator, operative to generate an enable signal for enabling the dynamic duty generator according to the error signal.

10. The control circuit of claim 1, further comprising a clamping circuit connected to the error amplifier for clamping a level of the error signal according to a second detecting signal related to at lease one of the input voltage, the output voltage, and an inductor current flowing through the inductor.

11. A control method for providing control signals to drive a buck-boost power stage of a buck-boost power converter to convert an input voltage to an output voltage, the buck-boost power stage including an inductor and at least two power switches connected to the inductor, the control method comprising the steps of:
(A) detecting the output voltage to generate a feedback signal;
(B) amplifying a difference between the feedback signal and a reference voltage to generate an error signal;
(C) determining a duty insertion signal according to a detecting signal;
(D) asserting the duty insertion signal responsive to an enable signal; and
(E) determining the control signals according to the error signal and duty insertion signal.

12. The control method of claim 11, wherein the detecting signal is related to at least one of the input voltage, the output voltage, an inductor current flowing through the inductor, and a variation of the output voltage.

13. The control method of claim 11, further comprising the steps of:
providing a compensation signal according to the detecting signal; and
compensating the error signal according to the compensation signal.

14. The control method of claim 13, wherein the step (C) comprises the steps of:
converting the detecting signal into the compensation signal; and
converting the compensation signal into the duty insertion signal.

15. The control method of claim 13, wherein the step of compensating the error signal according to the compensation signal comprises the steps of:
dividing the error signal responsive to the compensation signal to generate a divided error voltage;
converting the divided error voltage into a compensating current for a resistor to generate a compensating voltage; and
adjusting the error signal according to the compensating voltage.

16. The control method of claim 11, wherein the step (E) comprises the steps of:
comparing the error signal with a ramp signal to generate a first comparison signal;
comparing the duty insertion signal with the ramp signal to generate a second comparison signal; and
generating the control signals according to the first and second comparison signals.

17. The control method of claim 11, further comprising the step of generating the enable signal according to the detecting signal.

18. The control method of claim 11, further comprising the step of generating the enable signal according to the error signal.

19. The control method of claim 11, further comprising the step of clamping a level of the error signal according to a second detecting signal related to at least one of the input voltage, the output voltage, and an inductor current flowing through the inductor.

20. A control circuit for providing control signals to drive a buck-boost power stage of a buck-boost power converter to convert an input voltage to an output voltage, the buck-boost power stage including an inductor and at least two power switches connected to the inductor, the control circuit comprising:
a feedback circuit operative to detect the output voltage to generate a feedback signal;
an error amplifier connected to the feedback circuit, for amplifying a difference between the feedback signal and a reference voltage to generate an error signal;
a duty compensator connected to the error amplifier, for compensating the error signal according to a compensation signal to generate a compensated error signal;
a dynamic duty generator connected to the duty compensator, operative to generate a duty insertion signal after being enabled; and
a driver connected to the duty compensator and dynamic duty generator, operative to determine the control signals according to the compensated error signal and the duty insertion signal.

21. The control circuit of claim 20, wherein the duty compensator comprises:
a voltage dividing circuit connected to the error amplifier, for dividing the error signal responsive to the compensation signal to generate a divided error voltage;
a voltage-to-current converter connected to the voltage dividing circuit, for converting the divided error voltage into a compensating current; and
a resistor connected between the error amplifier and voltage-to-current converter, for generating a compensating voltage in response to the compensating current;
wherein the compensating voltage is subtracted from the error signal to generate the compensated error signal.

22. The control circuit of claim 20, wherein the dynamic duty generator provides the duty insertion signal according to a detecting signal related to at least one of the input voltage, the output voltage, an inductor current flowing through the inductor, and a variation of the output voltage.

23. The control circuit of claim 22, wherein the dynamic duty generator generates the compensation signal according to the detecting signal.

24. The control circuit of claim 23, wherein the dynamic duty generator comprises:
an analog-to-digital converter for converting the detecting signal into the compensation signal; and a digital-to-analog converter connected to the analog-to-digital converter, for converting the compensation signal into the duty insertion signal.

25. The control circuit of claim 20, wherein the duty insertion signal is fixed.

26. The control circuit of claim 20, wherein the driver comprises:
   a first comparator connected to the duty compensator, for comparing the compensated error signal with a ramp signal to generate a first comparison signal;
   a second comparator connected to the dynamic duty generator, for comparing the duty insertion signal with the ramp signal to generate a second comparison signal; and
   a drive logic circuitry connected to the first and second comparators, operative to generate the control signal according to the first and second comparison signals.

27. The control circuit of claim 20, further comprising a mode selector connected to the dynamic duty generator, operative to generate an enable signal according to the detecting signal to enable the duty generator, wherein the detecting signal is related to at least one of the input voltage, the output voltage, an inductor current flowing through the inductor, and a variation of the output voltage.

28. The control circuit of claim 20, further comprising a mode selector connected to the dynamic duty generator, operative to generate an enable signal according to the error signal to enable the duty generator.

29. The control circuit of claim 20, further comprising a clamping circuit connected to the error amplifier, for clamping a level of the error signal according to a detecting signal related to at lease one of the input voltage, the output voltage and an inductor current flowing through the inductor.

30. A control method for providing control signals to drive a buck-boost power stage of a buck-boost power converter to convert an input voltage to an output voltage, the buck-boost power stage including an inductor and at least two power switches connected to the inductor, the control method comprising the steps of:
   (A) detecting the output voltage to generate a feedback signal;
   (B) amplifying a difference between the feedback signal and a reference voltage to generate an error signal;
   (C) compensating the error signal to generate a compensated error signal;
   (D) asserting a duty insertion signal responsive to an enable signal; and
   (E) determining the control signals according to the compensated error signal and duty insertion signal.

31. The control method of claim 30, wherein the step (C) comprises the step of determining a compensation signal according to a detecting signal related to at least one of the input voltage, the output voltage, an inductor current flowing through the inductor, and a variation of the output voltage, for compensating the error signal.

32. The control method of claim 30, wherein the step (C) comprises the steps of:
   dividing the error signal responsive to the compensation signal to generate a divided error voltage;
   converting the divided error voltage into a compensating current for a resistor to generate a compensating voltage; and
   subtracting the compensating voltage from the error signal to generate the compensated error signal.

33. The control method of claim 31, further comprising the step of generating a dynamic signal according to the detecting signal as the duty insertion signal.

34. The control method of claim 33, wherein the step of generating a dynamic signal according to the detecting signal as the duty insertion signal comprises the steps of:
   converting the detecting signal into the compensation signal; and
   converting the compensation signal into the duty insertion signal.

35. The control method of claim 30, further comprising the step of generating a fixed signal as the duty insertion signal.

36. The control method of claim 30, wherein the step (E) comprises the steps of:
   comparing the compensated error signal with a ramp signal to generate a first comparison signal;
   comparing the duty insertion signal with the ramp signal to generate a second comparison signal; and
   generating the control signals according to the first and second comparison signals.

37. The control method of claim 30, further comprising the step of generating the enable signal according to a detecting signal related to at least one of the input voltage, the output voltage, an inductor current flowing through the inductor, and a variation of the output voltage.

38. The control method of claim 30, further comprising the step of generating the enable signal according to the error signal.

39. The control method of claim 30, further comprising the step of clamping a level of the error signal according to a detecting signal related to at least one of the input voltage, the output voltage, and an inductor current flowing through the inductor.

40. A control circuit for providing control signals to drive a buck-boost power stage of a buck-boost power converter to convert an input voltage to an output voltage, the buck-boost power stage including an inductor and at least two power switches connected to the inductor, the control circuit comprising:
   a feedback circuit operative to detect the output voltage to generate a feedback signal;
   an error amplifier connected to the feedback circuit, for amplifying a difference between the feedback signal and a reference voltage to generate an error signal;
   a clamping circuit connected to the error amplifier, for clamping a level of the error signal according to a detecting signal; and
   a driver connected to the error amplifier, operative to determine the control signals according to the error signal and a duty insertion signal.

41. The control circuit of claim 40, wherein the detecting signal is related to at least one of the input voltage, the output voltage, and an inductor current flowing through the inductor.

42. The control circuit of claim 40, further comprising a dynamic duty generator connected to the driver, operative to generate the duty insertion signal according to a second detecting signal related to at least one of the input voltage, the output voltage, an inductor current flowing through the inductor, and a variation of the output voltage.

43. The control circuit of claim 42, wherein the dynamic duty generator further provides a compensation signal according to the second detecting signal.

44. The control circuit of claim 43, wherein the dynamic duty generator comprises:
   an analog-to-digital converter for converting the second detecting signal into the compensation signal; and
   a digital-to-analog converter connected to the analog-to-digital converter, for converting the compensation signal into the duty insertion signal.

45. The control circuit of claim 43, further comprising a duty compensator connected to the error amplifier, dynamic duty generator and driver, operative to compensate the error signal according to the compensation signal.

46. The control circuit of claim 45, wherein the duty compensator comprises:
    a voltage dividing circuit connected to the error amplifier, for dividing the error signal responsive to the compensation signal to generate a divided error voltage;
    a voltage-to-current converter connected to the voltage dividing circuit, for converting the divided error voltage into a compensating current; and
    a resistor connected between the error amplifier and voltage-to-current converter, for generating a compensating voltage in response to the compensating current, to adjust the error signal.

47. The control circuit of claim 42, further comprising a mode selector connected to the dynamic duty generator, operative to generate an enable signal according to the second detecting signal to enable the dynamic duty generator.

48. The control circuit of claim 42, further comprising a mode selector connected to the dynamic duty generator, operative to generate an enable signal according to the error signal to enable the dynamic duty generator.

49. The control circuit of claim 40, wherein the driver comprises:
    a first comparator connected to the error amplifier, for comparing the error signal with a ramp signal to generate a first comparison signal;
    a second comparator for comparing the duty insertion signal with the ramp signal to generate a second comparison signal; and
    a drive logic circuitry connected to the first and second comparators, operative to generate the control signals according to the first and second comparison signals.

50. A control method for providing control signals to drive a buck-boost power stage of a buck-boost power converter to convert an input voltage to an output voltage, the buck-boost power stage including an inductor and at least two power switches connected to the inductor, the control method comprising the steps of:
    (A) detecting the output voltage to generate a feedback signal;
    (B) amplifying a difference between the feedback signal and a reference voltage to generate an error signal;
    (C) clamping a level of the error signal according to a detecting signal; and
    (D) determining the control signals according to the error signal and a duty insertion signal.

51. The control method of claim 50, wherein the detecting signal is related to at least one of the input voltage, the output voltage, and an inductor current flowing through the inductor.

52. The control method of claim 50, further comprising the step of generating the duty insertion signal according to a second detecting signal related to at least one of the input voltage, the output voltage, an inductor current flowing through the inductor, and a variation of the output voltage.

53. The control method of claim 52, further comprising the steps of:
    generating a compensation signal according to the second detecting signal; and
    compensating the error signal according to the compensation signal.

54. The control method of claim 53, wherein the step of generating the duty insertion signal comprises the steps of:
    converting the second detecting signal into the compensation signal; and
    converting the compensation signal into the duty insertion signal.

55. The control method of claim 52, further comprising the steps of:
    dividing the error signal responsive to the compensation signal to generate a divided error voltage;
    converting the divided error voltage into a compensating current for a resistor to generate a compensating voltage; and
    adjusting the error signal according to the compensating voltage.

56. The control method of claim 52, further comprising the step of generating an enable signal according to the second detecting signal to assert the duty insertion signal.

57. The control method of claim 50, further comprising the step of generating an enable signal according to the error signal to assert the duty insertion signal.

58. The control method of claim 50, wherein the step (D) comprises the steps of:
    comparing the error signal with a ramp signal to generate a first comparison signal;
    comparing the duty insertion signal with the ramp signal to generate a second comparison signal; and
    generating the control signals according to the first and second comparison signals.

59. A control circuit for providing control signals to drive a buck-boost power stage of a buck-boost power converter to convert an input voltage to an output voltage, the buck-boost power stage including an inductor and at least two power switches connected to the inductor, the control circuit comprising:
    a feedback circuit operative to detect the output voltage to generate a feedback signal;
    an error amplifier connected to the feedback circuit, for amplifying a difference between the feedback signal and a reference voltage to generate an error signal;
    a clamping circuit connected to the error amplifier, for clamping a level of the error signal according to a detecting signal; and
    a duty compensator connected to the error amplifier, for compensating the error signal according to a compensation signal to generate a compensated error signal;
    a dynamic duty generator connected to the duty compensator, operative to generate a duty insertion signal according to a second detecting signal after being enabled;
    a mode selector connected to the dynamic duty generator, operative to provide an enable signal for enabling the dynamic duty generator; and
    a driver connected to the duty compensator and dynamic duty generator, operative to determine the control signals according to the compensated error signal and duty insertion signal.

60. The control circuit of claim 59, wherein the first detecting signal is related to at least one of the input voltage, the output voltage, and an inductor current flowing through the inductor.

61. The control circuit of claim 59, wherein the second detecting signal is related to at least one of the input voltage, the output voltage, an inductor current flowing through the inductor, and a variation of the output voltage.

62. The control circuit of claim 59, wherein the duty compensator comprises:
    a voltage dividing circuit connected to the error amplifier, for dividing the error signal responsive to the compensation signal to generate a divided error voltage;

a voltage-to-current converter connected to the voltage dividing circuit, for converting the divided error voltage into a compensating current; and a resistor connected between the error amplifier and voltage-to-current converter, for generating a compensating voltage in response to the compensating current;

wherein the compensating voltage is subtracted from the error signal to generate the compensated error signal.

63. The control circuit of claim 59, wherein the dynamic duty generator provides the compensation signal according to the second detecting signal to the duty compensator.

64. The control circuit of claim 63, wherein the dynamic duty generator comprises:

an analog-to-digital converter for converting the second detecting signal into the compensation signal; and a digital-to-analog converter connected to the analog-to-digital converter, for converting the compensation signal into the duty insertion signal.

65. The control circuit of claim 59, wherein the mode selector generates the enable signal according to the second detecting signal.

66. The control circuit of claim 59, wherein the mode selector generates the enable signal according to the error signal.

67. The control circuit of claim 59, wherein the driver comprises:

a first comparator connected to the duty compensator, for comparing the compensated error signal with a ramp signal to generate a first comparison signal;

a second comparator connected to the dynamic duty generator, for comparing the duty insertion signal with the ramp signal to generate a second comparison signal; and a drive logic circuitry connected to the first and second comparators, operative to generate the control signals according to the first and second comparison signals.

68. A control method for providing control signals to drive a buck-boost power stage of a buck-boost power converter to convert an input voltage to an output voltage, the buck-boost power stage including an inductor and at least two power switches connected to the inductor, the control method comprising the steps of:

(A) detecting the output voltage to generate a feedback signal;

(B) amplifying a difference between the feedback signal and a reference voltage to generate an error signal;

(C) clamping a level of the error signal according to a first detecting signal;

(D) asserting a duty insertion signal responsive to an enable signal;

(E) determining the duty insertion signal according to a second detecting signal;

(F) compensating the error signal to generate a compensated error signal; and (G) determining the control signals according to the compensated error signal and duty insertion signal.

69. The control method of claim 68, wherein the first detecting signal is related to at least one of the input voltage, the output voltage, and an inductor current flowing through the inductor.

70. The control method of claim 68, wherein the second detecting signal is related to at least one of the input voltage, the output voltage, an inductor current flowing through the inductor, and a variation of the output voltage.

71. The control method of claim 68, wherein the step (D) comprises the step of generating the enable signal according to the second detecting signal.

72. The control method of claim 68, wherein the step (D) comprises the step of generating the enable signal according to the error signal.

73. The control method of claim 68, wherein the step (F) comprises the step of generating a compensation signal according to the second detecting signal to compensate the error signal.

74. The control method of claim 73, wherein the step (E) comprises the steps of:

converting the second detecting signal into the compensation signal; and converting the compensation signal into an analog signal as the duty insertion signal.

75. The control method of claim 68, wherein the step (F) comprises the steps of:

dividing the error signal responsive to the compensation signal to generate a divided error voltage;

converting the divided error voltage into a compensating current for a resistor to generate a compensating voltage; and subtracting the compensating voltage from the error signal to generate the compensated error signal.

76. The control method of claim 68, wherein the step (G) comprises the steps of:

comparing the compensated error signal with a ramp signal to generate a first comparison signal;

comparing the duty insertion signal with the ramp signal to generate a second comparison signal; and generating the control signals according to the first and second comparison signals.

* * * * *